(12) United States Patent
Bilski

(10) Patent No.: US 7,807,731 B1
(45) Date of Patent: Oct. 5, 2010

(54) MINERAL OIL INFUSION OF POLYPROPYLENE

(76) Inventor: David A. Bilski, 108 W. Mill St., Goodland, IN (US) 47948

( * ) Notice: Subject to any disclaimer, the term of this patent is extended or adjusted under 35 U.S.C. 154(b) by 14 days.

(21) Appl. No.: 12/100,928

(22) Filed: Apr. 10, 2008

Related U.S. Application Data

(63) Continuation of application No. 11/402,364, filed on Apr. 7, 2006, now abandoned.

(51) Int. Cl.
*C08K 5/00* (2006.01)
(52) U.S. Cl. ............... 523/124; 524/81; 524/570
(58) Field of Classification Search ............ 524/81, 524/435, 570; 523/124
See application file for complete search history.

(56) References Cited

U.S. PATENT DOCUMENTS 5,087,650 A * 2/1992 Willett ............... 524/47
5,480,939 A * 1/1996 Jackson et al. ............... 525/120

* cited by examiner

*Primary Examiner*—Kriellion A Sanders
(74) *Attorney, Agent, or Firm*—C. G. Mersereau; Nikolai & Mersereau, P.A.

(57) ABSTRACT

A biodegradable plastic used for disposable packaging and other product which will degrade when disposed of in a land fill. The biodegradation begins in about 10 years after disposal. The shelf life of the disposable products is about 90 to 120 days before the infused mineral oil will begin to weep out of the plastic. The shelf life will be decreased if the plastic is stored at above 50 degrees Centigrade. The biodegradable plastic is made from a mixture of about 11.5% by weight of medical grade mineral oil to polypropylene. A mixing device having a feed chamber with polypropylene and mineral oil added to the feed chamber at a rate coordinated with the movement of the mixing and infusion screw delivers infused mineral oil in the polypropylene at a desired mixture ratio to a mold.

10 Claims, 1 Drawing Sheet

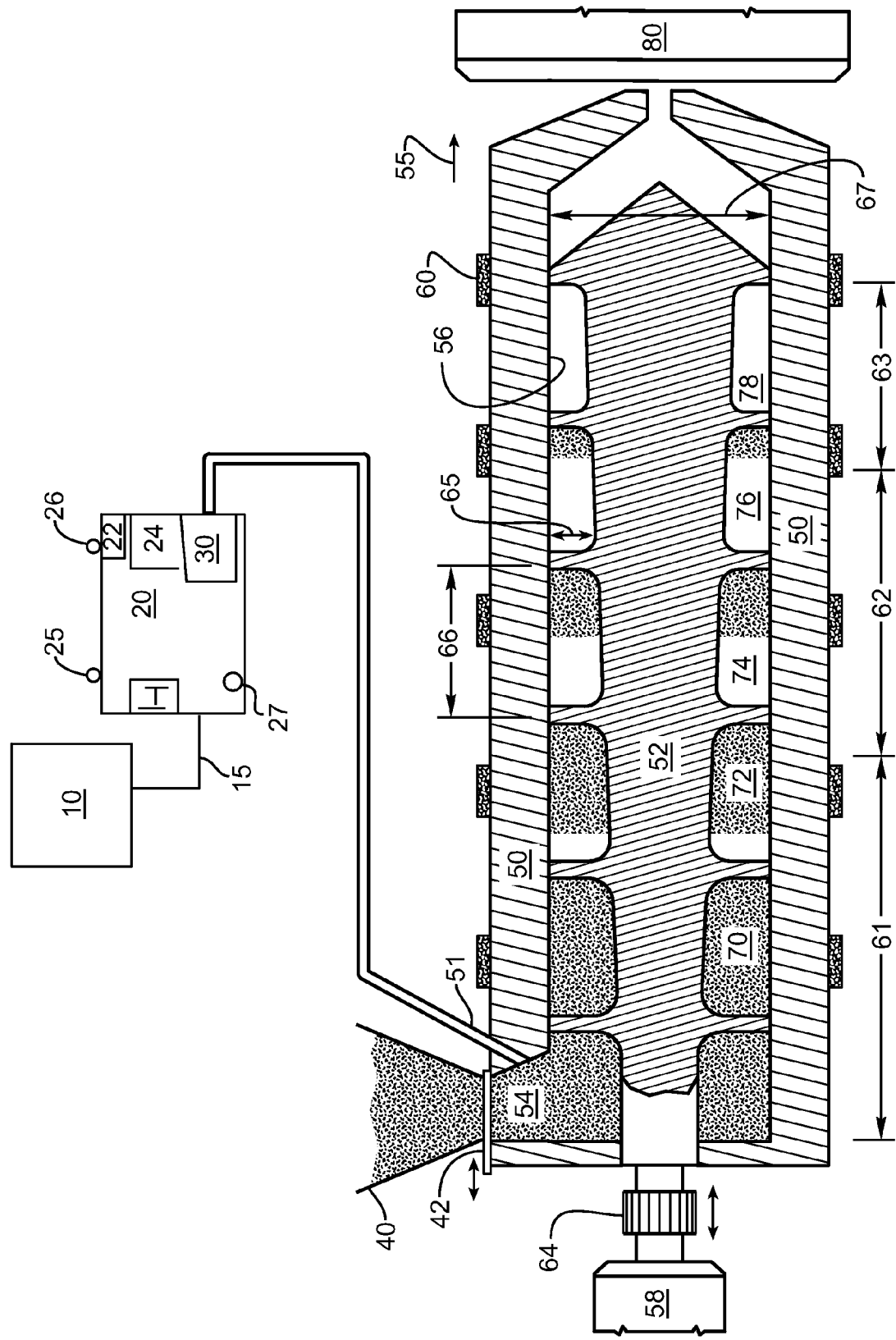

MINERAL OIL INFUSION OF POLYPROPYLENE

CROSS-REFERENCE TO RELATED APPLICATIONS

This application is a continuation of Ser. No. 11/402,364 filed Apr. 7, 2006.

BACKGROUND OF THE INVENTION

1. Field of the Invention

This invention relates to mineral oil infusion of polypropylene to produce biodegradable plastic.

2. Description of the Related Art

It has been known that mineral oil mixed with polypropylene will produce a biodegradable plastic, however too much mineral oil mixed with the polypropylene will result in premature degradation of the plastic and too little mineral oil mixed with the polypropylene will result in the plastic not degrading as desired.

In the medical industry mineral oil has been mixed with polypropylene resulting in a lower cost plastic which is then disposable by incineration after use. The amount of mineral oil mixed with the polypropylene was not carefully controlled as the product was to have a short shelf life and then be incinerated, therefore exact mixtures for long shelf life and biodegradability in land fills was not a problem that was addressed.

In some prior art mineral oil and polypropylene mixing devices the mineral oil was mixed with the polypropylene in a hopper above a feed throat to a barrel with a screw for infusing the mineral oil into the polypropylene. The resulting mixture was not controlled for exact percentages in the mixture and mineral oil would escape the hopper-feed throat interface creating a potential fire hazard.

It is desired to have a plastic polypropylene product with a long shelf life for use in a disposable product which will biodegradably decay in a land fill in a reasonable amount of time. In order to obtain such a plastic the mixture of mineral oil to polypropylene should accurately controller to be about 11.5% mineral oil by weight.

SUMMARY OF THE INVENTION

A mixture of mineral oil and polypropylene has been developed which uses about 11.5% by weight of mineral oil to polypropylene, providing a plastic material which will have a long shelf life when used in a disposable product and yet will be biodegradable in a landfill such that it will degrade in approximately 10 years.

Since polypropylene is an expensive material compared to mineral oil the mineral oil and polypropylene mixture costs less to produce than a pure polypropylene object.

It is intended that the mineral oil and polypropylene mixture will be used in disposable products such as security cases used on CDs and DVDs as well as other packaging products which are not intended to be in use for extended periods of time and yet will be biodegradable in land fills.

The mineral oil to polypropylene mixture should be from about 8% to about 14% mineral oil by weight and more preferably between about 11% to about 12% mineral oil by weight with about 11.5% being optimum.

A device for mixing the mineral oil with the polypropylene at the desired ratio is shown. The machine controls the amount of mineral oil added to the polypropylene without spilling the mineral oil which results in undesired mixture ratios and the spilled mineral oil may be a safety hazard or a fire hazard. The controlled addition of mineral oil also prevents backup of mineral oil into the polypropylene hopper, which also results in an improper mixture of mineral oil and polypropylene.

In order to provide the proper mineral oil to polypropylene mixture mineral oil is added to the feed throat to the level of top of the screw while the screw turns and retracts in the barrel to mix the mineral oil and polypropylene in a heated barrel at the desired percentages. The resulting mixture has a long shelf life and is biodegradable in landfills. The resulting mixture is therefore desirable for use in disposable plastic products such as packaging.

OBJECTS OF THE INVENTION

It is an object of the invention to produce a biodegradable plastic.

It is an object of the invention to provide a biodegradable plastic for disposable products.

It is an object of the invention to have a long shelf life of the biodegradable plastic for a long usable life of a product.

It is an object of the invention to have a biodegradable product which will degrade in a landfill in on the order of 10 years.

It is an object of the invention to produce a biodegradable plastic by mixing about 11.5% by weight of mineral oil with polypropylene.

It is an object of the invention to accurately infuse mineral oil with polypropylene.

It is an object of the invention to accurately pump the correct amount of mineral oil to the feed throat of the mixing machine for each batch of product made.

It is an object of the invention to reduce the cost of disposable polypropylene products.

Other objects, advantages and novel features of the present invention will become apparent from the following description of the preferred embodiments when considered in conjunction with the accompanying drawings.

BRIEF DESCRIPTION OF THE DRAWINGS

FIG. 1 is a schematic view of the mineral oil and polypropylene mixing apparatus.

DESCRIPTION OF THE PREFERRED EMBODIMENTS

The mineral oil infusion of polypropylene may be accomplished by a device as shown in FIG. 1. A hopper 40 having polypropylene in the form of granules or pellets is positioned above the feed throat 54 of barrel 50. When the hopper shut off plate 42 is opened by the operator polypropylene granules drop into and fill the feed throat 54 of barrel 50. Mineral oil is pumped in to feed throat 54 under pressure. A known amount of mineral oil is added to the know amount of polypropylene so that the mixture will be at the desired percentage of about 11.5% mineral oil to polypropylene by weight as it enters the barrel cylinder 56 by motion of the screw 52 rotating and retracting in the barrel 50. As the screw 52 turns and retracts it infuses the mineral oil into the polypropylene as the mixture is heated by heater bands 60 pushed by the screw 52 through the barrel 50. The mineral oil being added to the feed throat 54 covers the screw and insures the proper mix of polypropylene and mineral oil entering the screw 52 to be mixed in the barrel 50.

A mineral oil supply is kept in tank 10. The mineral oil is fed from tank 10 to pump 20 thorough tube 15. Pump 20 feeds the mineral oil through the oil inlet tube 51 to the feed throat 54 in barrel 50 under pressure. The amount of mineral oil delivered to the feed throat 54 is measured by flow meter 30 on pump 20 and is calibrated to the rotation and retraction of the screw 52 in barrel 50.

In the embodiment shown pump 20 is equipped with a flow light 25 indicating the pump is on and mineral oil is being delivered to the barrel 50. If the pump 20 is not on and the flow sensor 30 does not detect mineral oil flowing to the barrel 50 then the no flow light 26 comes on and an audio alarm 27 sounds. The alarm is to notify the machine operator that there is a problem.

The infusion of mineral oil into polypropylene in the embodiment shown uses a barrel 50 with a screw 52. The screw 52 may be of different designs. As shown the screw has a feed portion 61 a transition portion 62 and a metering portion 63. The screw shaft diameter increases from the feed portion 61 to the metering portion such that the flight depth 65 decreases as the mineral oil and polypropylene is pushed along the barrel 50 by the screw 52. The diameter of the threads on the screw 52 remains the same but the pitch and distance between the threads may vary to promote mixing.

As shown in the figure, at position 70, the polypropylene and oil mixture has the polypropylene still 100% in granular form. As the polypropylene and mineral oil is moved along the barrel 50 by screw 52 and heated by heating band 60 the polypropylene melts as at position 72 where approximately 25% has melted and is being mixed with the mineral oil. By position 74 approximately 50% of the polypropylene has melted and is being mixed with the mineral oil. By position 76 approximately 75% of the polypropylene has melted and is being mixed with the mineral oil. By position 78, 100% of the polypropylene has melted and is being mixed with the mineral oil.

The mineral oil is fed to the feed throat 54 under pressure so that the mineral oil is maintained at a level at lease as high as the top of screw 52. If the mineral oil is not at least to this level in the feed chamber the mix of polypropylene and mineral oil will vary as the screw 52 empties the feed throat 54. The screw 52 speed and the oil pump 20 and oil pressure are controlled to ensure the proper percentage of infusion of mineral oil into the polypropylene.

When the retract of the screw 52 reaches the end and delivers the infused polypropylene mineral oil mixture to the mold 80, pump 20 shuts off and remains off until relay 20 is tripped when the screw 52 moves forward to its beginning position ready to retract and rotate to infuse mineral oil into polypropylene on its next stroke. If after a millisecond the of the screw retraction signal coming on when screw retraction begins, if mineral oil is not flowing through the flow sensor 30, alarm 27 will sound and the no flow light 26 will come on. If mineral oil is flowing correctly the flow light 25 comes on.

Screw 52 is then retracted in direction 55 as it rotates to deliver more mineral oil infused polypropylene to a mold 80 for use in making a plastic product.

The hopper shut off plate 42 is moved by the operator to the closed position to stop the flow of polypropylene at the end of a production run and pump 20 is turned off.

The screw 52 is turned at spline 64 by a motor (not shown). The screw 52 retracts and is moved forward by cylinder 58.

A controller having all the parameters for running the pump 20, rotating the screw 52 and moving the cylinder 58 can be programmed for the desired mixtures.

The barrel 50 should be heated to between about 176 degrees and 232 degrees Centigrade (350-450 Fahrenheit) to melt the polypropylene during the infusion process.

Although the screw shown has one style of flight, depth, pitch change, and length other screws which vary these and other parameters may be used in the barrel to insure infusion of the mineral oil into polypropylene.

The mineral oil used may be of any grade however it is preferred to use a light medical grade such as DRAKEOL 34® brand or MARCOL N82® brand mineral oil.

The mixture of mineral oil to polypropylene should be about 11.5% by weigh of mineral oil to the weight of polypropylene in order to have a good shelf life and to have a land fill life of about 10 years before the biodegradable plastic begins to decompose in the land fill. An 18 gram security frame made from the infused mineral oil in polypropylene would have about 15.93 grams of polypropylene. The saving of about 2 grams of polypropylene replaced with mineral oil makes the resultant packaging material less expensive and more environmentally friendly. Although 11.5% by weight is the desired ratio of mineral oil to polypropylene a range of from about 8% to about 14% mineral oil may be used.

Obviously, many modifications and variations of the present invention are possible in light of the above teachings. It is therefore to be understood that, within the scope of the appended claims, the invention may be practiced otherwise than as specifically described.

What is claimed is:

1. A method of providing a biodegradable, mineral oil infused polypropylene composition comprising:
    (a) adding a known amount of polypropylene to a feed throat of a screw conveyor, the polypropylene feed comprising granules or pellets;
    (b) adding a known amount of mineral oil to said feed throat; and
    (c) mixing said polypropylene and said mineral oil using said screw conveyor while heating said screw conveyor in a manner such that said polypropylene is completely melted during said mixing operation.

2. A method as in claim 1 wherein said mineral oil is added to said screw conveyor under pressure.

3. A method as in claim 1 wherein said screw conveyor is heated to a temperature between about 176° C. and 232° C.

4. A method as in claim 1 wherein said polypropylene and said mineral oil are added sequentially to said screw conveyor.

5. A method as in claim 1 wherein said screw conveyor includes flights having a plurality of pitches.

6. A method as in claim 1 wherein said mineral oil is a light medical grade mineral oil.

7. A method as in claim 2 wherein said mixture of mineral oil to polypropylene includes from about 8% to about 14% by weight of mineral oil to the weight of polypropylene.

8. A method as in claim 7 wherein the mixture of mineral oil to polypropylene in the mixed composition is between about 11% and about 12%.

9. A method as in claim 8 wherein said mixture of mineral oil to polypropylene is about 11.5% by weight of mineral oil to the weight of polypropylene.

10. A method as in claim 1 wherein said mixed oil infused polypropylene composition is fed to a mold.

* * * * *